250-203.R 56

July 6, 1965 A. H. ROSENTHAL 3,192,824

SCANNING SYSTEM FOR LIGHT TRACKING DEVICE

Filed Dec. 20, 1960 2 Sheets-Sheet 1

INVENTOR.
ADOLPH H. ROSENTHAL
BY
OSTROLENK, FABER, GERB & SOFFEN
ATTORNEYS

INVENTOR.
ADOLPH H. ROSENTHAL
BY
OSTROLENK, FABER, GERB & SOFFEN
ATTORNEYS

United States Patent Office 3,192,824
Patented July 6, 1965

3,192,824

SCANNING SYSTEM FOR LIGHT TRACKING DEVICE

Adolph H. Rosenthal, Forest Hills, N.Y., assignor to Kollsman Instrument Corporation, Elmhurst, N.Y., a corporation of New York Filed Dec. 20, 1960, Ser. No. 77,199
4 Claims. (Cl. 88—1)

My invention relates to a novel scanning system for light tracking devices wherein a single scanning means can be used for scanning an image along two axes perpendicular to one another and to the optical axis of the system.

Scanning systems for light tracking devices are applicable to systems of the type shown in United States Patent 2,905,828 to O'Maley et al., assigned to the assignee of the present invention.

Light tracking devices of the type set forth in the above noted patent are utilized primarily for navigational purposes and are provided with an optical system adapted to transmit an image of a celestial object such as a star, the sun or the moon to a means which will seek to operate the optical system to maintain the image in the center of the field of view. The movements of the optical system may then be translated into corresponding movements of operating or adjusting members for vehicle guidance instruments or devices.

The background of the field of view is frequently illuminated in conjunction with the celestial body to be tracked. Thus, a scanning means is desired for scanning the image of the celestial object in a manner to minimize errors caused by background lighting.

Typical scanning devices of the type to which the present invention is applicable are shown in copending applications Serial No. 47,837, filed August 8, 1960, entitled "Light Modulation System," and Serial No. 77,198, now abandoned, filed December 20, 1960, entitled "Scanning Device for Light Tracking Systems," and Serial No. 71,248, filed November 23, 1960, entitled "Tuning Fork Scanner," all of which are assigned to the assignee of the present invention.

In the above noted applications, devices using two independent scanning devices which will scan an azimuth axis and altitude axis respectively are provided to obtain information of altitude and azimuth of a telescope with relation to a celestial body. Thus, in application Serial No. 47,837, a first vibrating reed carries a first aperture plate, while a second vibrating reed carries a second aperture plate. The reeds are so arranged and driven that the apertures therein will define a scanning axis first in a first direction and thereafter in a second and perpendicular direction to establish both an altitude and azimuth axis respectively.

Alternative to the use of a vibrating reed driven, for example, by a solenoid, the aperture plates could also be mounted on one tine of respective tuning forks which are electromagnetically driven in the manner disclosed in copending application Serial No. 71,248.

A third manner in which the aperture plates could be arranged is set forth in copending application Serial No. 77,198, now abandoned, wherein the image of the celestial object is split into two components which are directed to respective vibrating aperture systems wherein both an azimuth axis and altitude axis can be simultaneously established rather than first establishing one and then the other in a synchronous manner.

In accordance with the present invention, I provide means whereby only a single scanning means need be provided, although both azimuth scanning and altitude scanning are achieved with the single device. More specifically, in the present invention I cause the image of the celestial object to rotate by 90° at predetermined intervals whereby a single reed scanner positioned in the focal plane of the telescope objective will scan the image in an azimuth direction and, with the rotation of the image by 90°, will thereafter scan in an altitude direction.

In order to rotate the image as described above, a Dove prism may be positioned in front of the telescope objective whereby a rotation of the prism by 45° will cause the image of the telescope objective to rotate by 90°. Clearly, any other equivalent optical rotating device can be used.

Since with the novel invention, only a single scanning means is required for scanning two axes of the image, it will be apparent that I have substantially increased the reliability of the system in reducing the number of oscillating mechanical parts required. Further, the invention makes possible a decrease in the weight of the system where the weight of the optical means for rotating the image is less than the weight of a complete scanning mechanism.

As another embodiment of the invention, a light weight obscuring disk having an opening therein in front of the telescope objective can be rotated to permit incident light to pass through a first or second Dove prism which are positioned at 45° with respect to one another. Thus, the image passed by one prism is rotated by 90° with respect to the image passed by the other prism, and only a simple light weight disk need be rotated.

Accordingly, a primary object of this invention is to provide a novel scanning system for light tracking devices.

Another object of this invention is to provide a single scanning device for a light tracking system which can develop an azimuth axis and an altitude axis which are independent of one another.

Another object of this invention is to provide alternate azimuth and altitude tracking for a light tracking device by providing means for rotating the image of the body being tracked.

A further object of this invention is to provide a single scanning means for a light tracking device wherein the image of the body being tracked is rotatable by 90° so that the single scanning device will scan in azimuth or altitude depending upon the angular position of the image.

These and other objects of my invention will become apparent from the following description when taken in connection with the drawings, in which.

Figure 9:
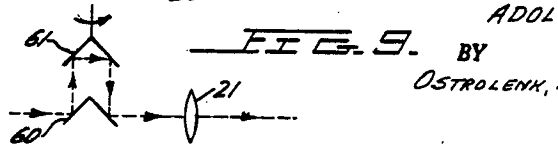

FIGURE 9 schematically illustrates the operation of the embodiment shown in FIGURES 5 through 8.

Figure 1:
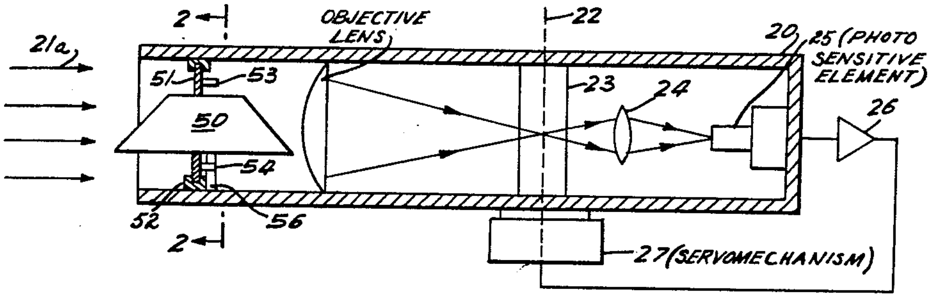
FIGURE 1 shows a side cross-sectional view of a typical star tracking device which can utilize a single scanning mechanism for scanning in two axes, in accordance with the present invention.
Figure 10:
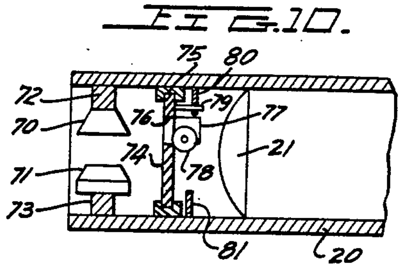

FIGURE 10 is a side cross-sectional view of a portion of the telescope of FIGURE 1 when modified with a still further type of image rotating mechanism.

Figure 11:
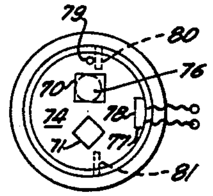

FIGURE 11 is a side view of the telescope of FIGURE 10.

Figures 12, 14:
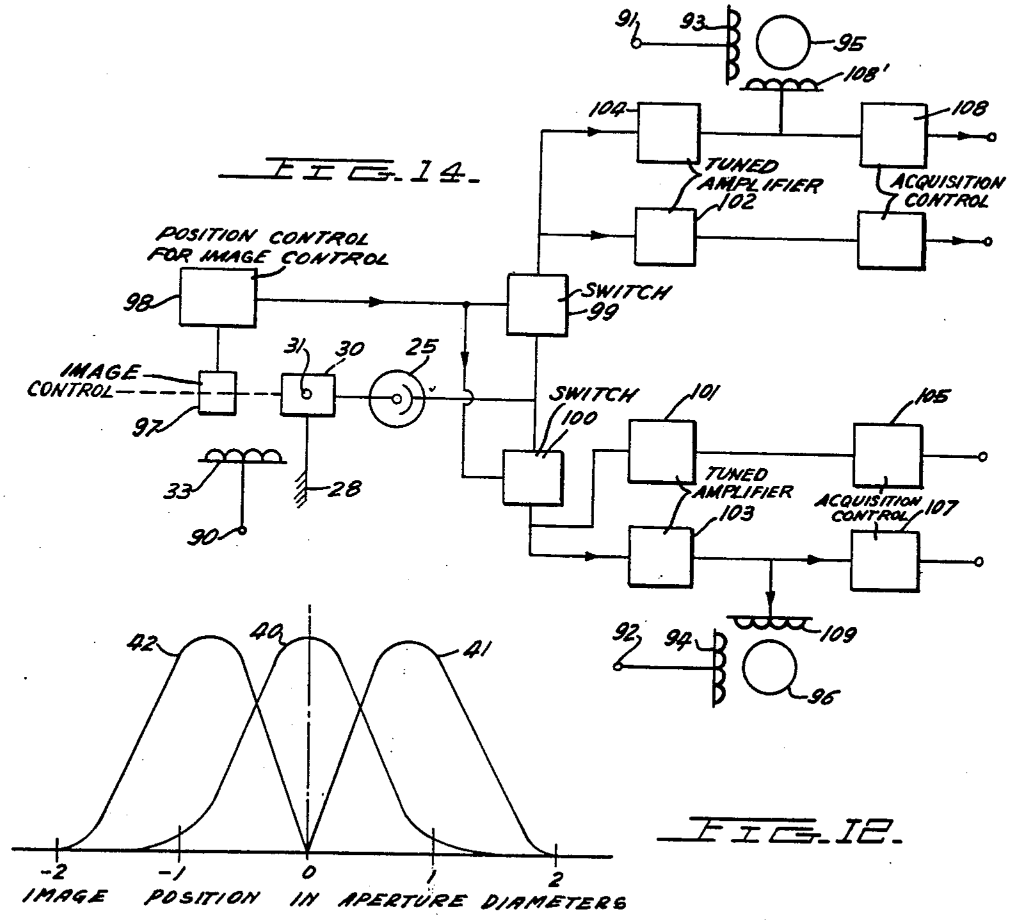

FIGURE 12 is a plot of the output voltages developed by the photo-sensing means of FIGURE 1 when the scanning device is utilized in accordance with the invention.

Figure 13:
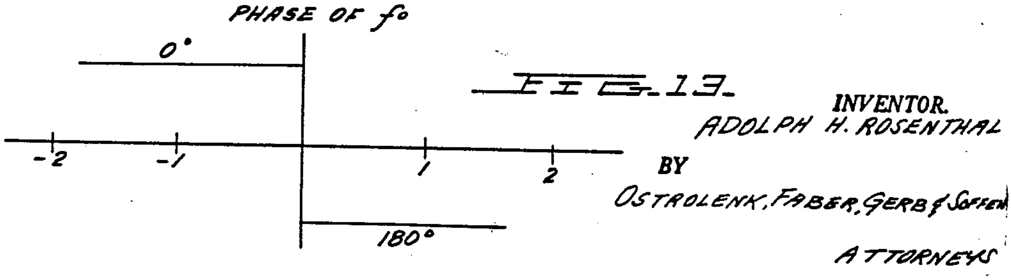

FIGURE 13 shows the phasing of the signal output of FIGURE 12.

FIGURE 14 is a line diagram which schematically illustrates the electrical circuitry for controlling an azimuth servo motor and altitude servo motor in accordance with the present invention.

Referring now to FIGURE 1, I have shown a star tracking system which includes a telescope housing 20 which has an objective lens system schematically shown by lens 21. Lens 21 focuses the light 21*a* from some celestial body at which the housing 20 is pointed on a focal plane 22 shown in dotted lines.

A scanning mechanism 23 to be described more fully hereinafter is contained within telescope housing 20 so that a scanning aperture moves in plane 22. After modulation of the light by the scanning mechanism 23, the light impinges upon a focusing system schematically shown by lens 24, and is thereafter focused upon some type of photo-sensitive element 25 which could, for example, be a photo-multiplier tube.

The output signals generated by photo-sensing device 25 are then applied to amplifier 26 which is connected to a servomechanism 27 which operates to control the alignment of telescope 20 to cause telescope housing 20 to follow the celestial body being tracked.

The scanning mechanism 23 can be of any desired type which causes an aperture to move with simple harmonic motion through the image of the celestial body produced at focal plane 22 by objective 21.

Figure 3:
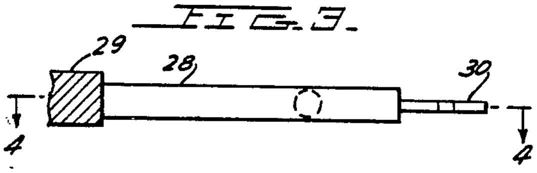
FIGURE 3 shows a top view of a reed-type scanner which may be used in the tracking device of FIGURE 1.
Figure 4:
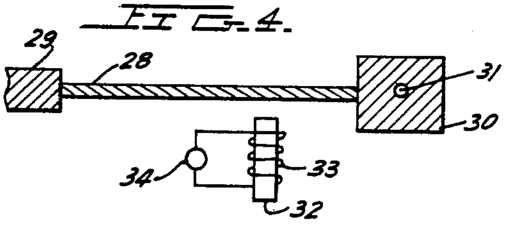
FIGURE 4 is a side cross-sectional view of the reed mechanism of FIGURE 3.

A typical scanning mechanism is shown in FIGURES 3 and 4 which comprises a thin read 28 of magnetic material which is rigidly secured to a base 29 (which could be telescope housing 20 of FIGURE 1), and has an aperture plate 30 at its opposite end. The aperture plate 30 has an aperture 31 therein whose diameter is approximately equal to the diameter of the image of the celestial body in plane 22.

A solenoid means which includes a core 32 and solenoid winding 33 which is connected to an A.-C. source 34 will cause reed 28 to vibrate with simple harmonic motion at the frequency of the A.-C. source 34. The excursion of this travel is preferably such that aperture 31 moves approximately four star images. That is to say, the aperture 31 will be caused to scan an area which is approximately four star images long and one star image wide.

The manner in which such scanning will give an indication of the relative alignment between telescope housing 20 and the celestial body being tracked is fully described in above noted copending application Serial No. 71,248. As shown in that application, a single scanning mechanism such as the reed of FIGURES 3 and 4 will deliver information only as to one of an azimuth or altitude axis.

This operation is such that when the star image is focused at a null position (the rest position of aperture 31) and as the aperture is caused to vibrate, the radiation from the celestial body will be interrupted twice during each cycle of the reed. This will cause a periodic signal to be developed by light-sensing device 25.

The fundamental component of this signal is equal to twice the reed frequency or the frequency of source 34, and is shown, for example, in FIGURE 12 as curve 40. More specifically, curve 40 of FIGURE 12 shows the amplitude of the second harmonic ($2f_0$) as a function of the image position for a constant image intensity. This signal is used to indicate that the celestial body is lined up precisely with the telescope axis.

If the star is now moved off the null position and along the line of vibration of aperture 31, then a periodic signal having a fundamental component equal to the reed frequency will be developed, as shown by curve 41 of FIGURE 12. This fundamental component will gradually increase in amplitude from zero to some maximum, and then decrease again as the star departs further from null.

If the star image moves off null in a direction opposite to that described above, the amplitude variation will be as before as shown in curve 42 in FIGURE 12, but the phase of the fundamental component will reverse. The phase relationship of the outputs of curves 41 and 42 of FIGURE 12 is shown in FIGURE 13 which shows phase on the vertical axis, as compared to image position on the horizontal axis plotted in aperture diameters.

Thus, the signal generated by photo-sensing device 25 can be utilized to servo the telescope 20 in azimuth or altitude depending upon the line along which aperture 31 oscillates. That is to say, normally when a single reed such as reed 28 of FIGURE 3 is used, only a single axis is established, and it has been necessary in the past to provide still another scanning mechanism in which an aperture moves in a direction perpendicular to aperture 31 to establish the other axis. This, however, requires the provision of a further scanning mechanism which introduces additional continuously moving elements into the system and thus provides additional possible source of failure for the system. Furthermore, the weight of the total system is increased.

I have recognized that I can produce the effect of two scanning mechanisms by causing the image produced by the telescope objective to be rotated by some angle, preferably 90°, whereby the single scanning mechanism will first scan along a first axis with respect to the image, but, when the image is rotated, will scan a second axis with respect to the image. Thus, instead of requiring two complete scanning mechanisms, I can now provide only a single scanning mechanism and thus only one set of continuously oscillating elements, and replace the other complete scanning mechanism that would be normally required by a relatively simple image rotating means.

Figure 2:
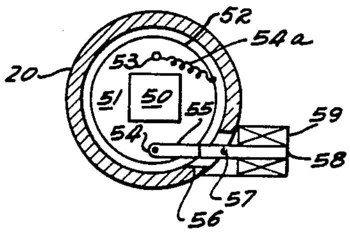
FIGURE 2 shows a side cross-sectional view of the novel image rotating mechanism of FIGURE 1 taken across the lines 2—2 of FIGURE 1.

As an illustration of an image rotating means which can be used in accordance with the present invention, I show in FIGURES 1 and 2 the manner in which a Dove prism 50 may be interposed between the telescope objective 21 and the incident radiation 21*a*.

The Dove prism 50 is secured within a plate 51 which rides in an annular bearing 52 secured to telescope housing 20 so that plate 51 and the Dove prism 50 secured thereto are rotatable with respect to the telescope housing 20.

A first and second projecting pin 53 and 54 respectively are provided for plate 51 where the pin 53 receives one end of a biasing spring 54*a* which has its other end secured in any desired manner to housing 20, while pin 54 receives a link 55 (FIGURE 2) of a solenoid operating mechanism. More specifically, link 55 extends through a slot 56 in telescope housing 20 and is pivotally connected by pivot pin 57 to solenoid plunger 58. The solenoid plunger 58 is contained within a solenoid coil schematically shown as coil 59 which is secured to the external portions of housing 20.

The aforementioned mechanism is so designed that when the solenoid coil 59 is not energized, the plate 51 assumes the position shown under the influence of biasing spring 54*a*. When, however, the solenoid 59 is energized, the plunger 58 is retracted into the solenoid and thus causes link 55 to exert a force on pin 54 to rotate plate 51 in a counterclockwise direction in FIGURE 2 against the biasing force of spring 54*a*. This rotation is made to be 45° so that, as will be seen hereinafter, there will be an image rotation of 90°. Once the solenoid 59 is again deenergized, the spring 54*a* will then be able to rotate plate 51 back to the position shown. If desired, a rotary solenoid could be used in place of the operating mechanism described above to directly rotate the prism.

The aforementioned control of the angular relationship of Dove prism 50 with respect to telescope housing 20 will cause a rotation of the image focused in focal plane 22 of objective system 21. That is to say, a Dove prism will operate so as to invert the vertical component of light rays passing therethrough, although it leaves unaffected the horizontal component of light rays passing therethrough. By "horizontal" and "vertical," I mean here horizontal and vertical with respect to the bottom surface of the prism, as shown in FIGURE 1. Thus, for example, if a vertical arrow pointing upwardly were on the left of prism 50, the arrow would be inverted when observed from the right of prism 50. If now the observer and the arrow retain their relative positions and prism 50 is rotated about the axis of telescope 20 by 45°, then the arrow observed by the observer on the right of the prism would appear to rotate by 90°. That is to say, only that component of the direction of the arrow which is perpendicular to the base of prism 50 is inverted. The arrow as seen by the observer then would be the resultant of this inverted component of the arrow plus that component which is parallel to the base of the prism which is not inverted, this resultant arrow being rotated by 90° with respect to the observed position of the arrow to the right of the prism prior to rotation of the prism. The result, therefore, is that a rotation of prism 50 caused by operation of solenoid 59 will cause a rotation of the image of the celestial body observed by telescope 20 by twice the angle of prism rotation.

Accordingly, the scanning mechanism 23 which previously was scanning, for example, in azimuth will now be scanning the image in a direction perpendicular to this original azimuth direction, and thus will be scanning in altitude.

It will be noted that the use of a Dove prims 50 as described in FIGURES 1 and 2 is only one manner in which the image operated upon by scanning mechanism 23 can be rotated. By way of example, and as illustrated in FIGURES 5 through 9, a pair of right angle mirrors can be provided where, as shown in FIGURE 5, a first right angle mirror 60 is secured to telescope housing 20 in front of objective lens 21, while a rotatable right angle mirror 61 is positioned in spaced relationship with respect to mirror 60.

Figure 5:
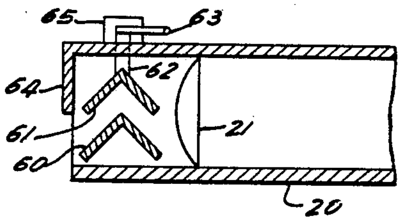
FIGURE 5 is a side cross-sectional view of a portion of the telescope of FIGURE 1 which shows a second embodiment of an image rotating means comprised of two right angle mirrors.
Figure 6:
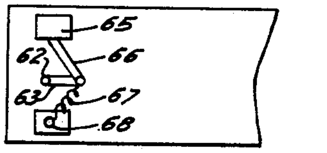
FIGURE 6 is a top view of FIGURE 5.
Figure 8:
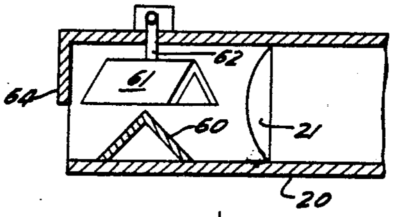
FIGURE 8 illustrates the mechanism of FIGURE 5 when one of the mirrors is rotated to rotate the image passed by the telescope objective.
Figure 7:
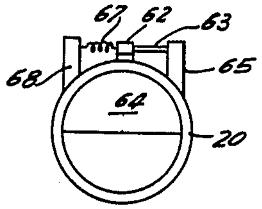
FIGURE 7 is a side view of FIGURE 5.

A central portion of mirror 61 has a shaft 62 attached thereto which extends through housing 20, and terminates in a crank arm 63, as shown in FIGURES 5, 6 and 7. Upon rotation of crank arm 63, the mirror 61 can be rotated by 45° to the position shown in FIGURE 8.

The upper half of the opening of telescope housing 20 is normally shielded by a semicircular shield 64, so that light is impinged only upon the left-hand phase of mirror 60. This light is then, by multiple reflection, transmitted ultimately to the lower portion of objective lens 21. When the mirrors are in the relationship shown in FIGURE 5, then the image will pass directly through the system and will not be inverted. This is schematically shown in FIGURE 9 where the light ray is illustrated by the dotted line so as to be reflected from the upper left-hand portion of mirror 60 to the inner left-hand portion of mirror 61 across to the inner right-hand portion of mirror 61 down to the upper right-hand portion of mirror 60, and thence into the objective 21. If now the mirror 61 is rotated as by 45°, the image transmitted through objective lens 21 will be rotated through 90° so that the single scanning mechanism provided as shown in FIGURE 1 can scan alternately in azimuth and then in altitude.

The operating mechanism for driving mirror 61 can include, for example, a solenoid mechanism schematically illustrated as solenoid mechanism 65. Solenoid mechanism 65 has an output link 66 (FIGURE 6) connected to the end of crank arm 63 and moves crank arm 63 against the force of a biasing spring 67 secured to housing portion 68 connected to housing 20 which normally biases the mirror toward some predetermined position such as the position shown in FIGURE 5. It is to be noted that the mirror 61 can be housed in an extension of housing 20 so that the surface of mirror 60 extends completely across the telescope housing opening. With this modification, the whole telescope objective aperture is utilized.

As a still further embodiment of the invention, and as is shown in FIGURES 10 and 11, two relatively small Dove prisms 70 and 71 may be supported from housing 20 by pedestals 72 and 73 respectively in the manner shown in FIGURES 10 and 11. The prisms, as best shown in FIGURE 11, are arranged at a 45° angle with respect to one another, and are positioned in front of a disk 74 which is contained within an annular bearing groove in ring 75 which is secured to housing 20. Disk 74 has an aperture 76 therein which, by rotation of disk 74, may be positioned between prism 70 and objective lens 21 or between prism 71 and objective lens 21. In the position of FIGURES 10 and 11, the aperture 76 is in alignment with prism 70.

When the aperture 76 is in alignment with prism 70, the image formed by objective lens 21 will have a first predetermined alignment. When, however, disk 74 is rotated so as to bring aperture 76 into alignment with prism 71 and to obscure prism 70, the resultant image will rotate by 90° since prisms 70 and 71 are at 45° angles with respect to one another. Thus, the scanning means contained at the focal plane of objective lens 21 can scan alternately in azimuth or altitude.

In order to rotate disk 74, any desired mechanism such as a rotary solenoid may be provided. By way of example, and as shown in FIGURES 10 and 11, a motor 77 secured to housing 20 may have an output driving wheel 78 which has some frictional type engaging material on its outer surface thereof such as rubber which bears against the surface of disk 74. The disk 74 is further provided with a projecting pin 79 which moves between projecting posts 80 and 81 respectively whereby when motor 77 is driven in a first direction so that disk 74 rotates in a clockwise direction in FIGURE 11, the disk 74 rotates until pin 79 engages stop 80, the motor thereafter supplying only enough torque to retain disk 74 in this position. The image then being scanned is that passed through prism 70.

When it is now desired to scan in a different direction, the energizing circuit to motor 77 is controlled so as to reverse the direction of rotation of motor 77 in any appropriate manner whereby the disk 74 is rotated from the position of FIGURE 11 in a counterclockwise direction until post 79 engages stop 81. Thereafter, the motor 77 need only supply enough torque to retain this new position. In this position, the aperture 76 of disk 74 is rotated into alignment with prism 71 so that the image being scanned is rotated by 90°.

A typical type of electrical system for use with the novel scanning mechanism of the present invention is schematically illustrated in FIGURE 14. Referring now to FIGURE 14, an input voltage which typically may be at 400 cycles is connected to terminals 90, 91 and 92 where at terminal 90 the voltage is applied to the driving coil 33 of the reed scanner schematically illustrated as including the reed 28 having aperture plate 30 at one end thereof, while terminals 91 and 92 are connected to fixed field windings 93 and 94 of altitude control motor 95 and azimuth control motor 96 respectively of the servo mechanism 27 of FIGURE 1. An image position control means 97 is then schematically illustrated as being positioned in front of the aperture 31 and in line with the light-sensing means 25 shown in FIGURE 14 as a photomultiplier which could be of the type 1P21.

The control means 98 for controlling the operation of image control means 97 is schematically illustrated for image control means 97, and could, for example, be the motor or solenoid control previously described above in the various embodiments of the invention.

Control means 98 is then electrically connected to switching means 99 and 100 respectively where, when control means 98 calls for, for example, the azimuth mode of operation, it will open the switching means 99 and close switching means 100. Alternatively, when control means 98 calls for altitude mode of operation, it closes switching means 99 and open switching means 100.

The output of photo-multiplier 25 is connected to 800-cycle tuned amplifiers 101 and 102 and 400-cycle tuned amplifiers 103 and 104 through the switching means 100 and 99 respectively. That is to say, during the altitude mode of operation, the switching means 99 is closed and switching means 100 is open so that the output of photo-sensing device 25 is connected to amplifiers 102 and 104. During azimuth mode of operation, however, only switching means 100 is closed so that the output of photo-sensing device 25 is connected only to amplifiers 101 and 103.

The outputs of each of amplifiers 101 through 104 are then connected to acquisition control circuits 105, 106, 107 and 108 respectively which have outputs connected in any desired manner to drive the servo mechanism elements in order to maintain the 800-cycle double frequency output of photo-sensing device 25. This, of course, will be the output frequency of photo-sensing device 25 when the star image is at a null position or central position in azimuth and in altitude, since reed 228 is oscillated at a frequency of 400 cycles.

If, during the altitude mode of operation, the star image moves off its null position, a signal will be received in the 400-cycle amplifier 104. Amplifier 104 is connected to the control field winding 103' of servo motor 95 whereby the motor 95 is energized responsive to an excursion of the celestial body image from a null position, the phase of the energization being dependent upon the sense of the excursion, as illustrated above.

In an identical manner, and during scanning in the azimuth mode, a deviation of the celestial body image from null will cause a signal to be developed in the 400-cycle amplifier 103 to deliver a signal to control field winding 109 of servo motor 96 which will cause the repositioning of the telescope housing to reduce the signal to null.

Accordingly, both the azimuth control motors 96 and altitude control motor 95 will operate to reposition the azimuth and altitude of the telescope to maintain the proper telescope alignment for retaining the celestial body image at null.

It is to be noted that, while in FIGURE 14 I have shown independent amplifiers for both the azimuth and altitude channels, a common amplifier channel could be used with appropriate switching mechanisms between the amplifiers and their respective acquisition circuits which are operable from control device 98.

Thus, it can be seen from FIGURE 14 that the novel invention, in addition to permitting simplification of the scanning mechanism, can further permit simplification in the electrical circuitry used in the tracking system.

Although I have described preferred embodiments of my novel invention, many variations and modifications will now be obvious to those skilled in the art, and I prefer, therefore, to be limited not by the specific disclosure herein but only by the appended claims.

I claim:

1. A light source tracking system comprising telescope means for imaging the light of a light source to be tracked in a focal plane, a scanning means, a light sensing means and an image rotating means; said scanning means including a vibrating aperture movable in the plane of said focal plane and vibrating along a substantially straight line with simple harmonic motion; said vibrating aperture having a null position along the optical axis of said telescope means; said light sensing means being positioned along the optical axis of said telescope means; said vibrating aperture being interposed between said telescope means and said light sensing means; said image rotating means being positioned in front of said telescope means and said scanning means; said image rotating means being rotatable from a first fixed position to a second fixed position to rotate said image in said focal plane through a predetermined angle.

2. The system substantially as set forth in claim 1 wherein said image rotating means rotates said image by 90°.

3. The system substantially as set forth in claim 1 wherein said image rotating means comprises a Dove prism.

4. The system substantially as set forth in claim 1; said image rotating means being comprised of a pair of right angle mirrors positioned in spaced relation with respect to one another for transmitting light from said source to said focal plane by multiple reflection; one of said mirrors being rotatable to rotate said image.

References Cited by the Examiner

UNITED STATES PATENTS

| | | | |
|---|---|---|---|
| 2,406,798 | 9/46 | Burroughs | 88—1 |
| 2,553,171 | 5/51 | Campos | 88—61 |
| 2,917,967 | 12/59 | Steglich | 88—1 |
| 2,923,202 | 2/60 | Trimble | 88—1 |
| 2,928,952 | 3/60 | Bednorz | 88—1 |
| 2,939,962 | 6/60 | Miller | 88—1 |
| 2,947,872 | 8/60 | Carbonara et al. | 88—1 |
| 3,002,098 | 9/61 | Watkins | 88—1 |
| 3,057,953 | 10/62 | Guerth | 88—1 X |
| 3,061,730 | 10/62 | Jankowitz | 250—203 |
| 3,084,261 | 4/63 | Wilson | 88—1 |

JEWELL H. PEDERSEN, *Primary Examiner.*

EMIL G. ANDERSON, *Examiner.*